United States Patent Office

2,797,983
Patented July 2, 1957

2,797,983

METHOD OF DETERMINING SMALL QUANTITIES OF URANIUM COMPOUNDS IN A GAS STREAM

Joseph Greenspan and Arthur S. Carlson, Brooklyn, N. Y., assignors, by mesne assignments, to the United States of America as represented by the United States Atomic Energy Commission No Drawing. Application April 24, 1947,
Serial No. 743,724

3 Claims. (Cl. 23—232)

The present invention relates to a method of determining the concentration of uranium salts in a fluid stream and more particularly the invention relates to a method of determining semi-quantitatively small concentrations of uranium hexafluoride in a gas stream comprising chiefly nitrogen and other relatively stable gases or vapors.

Recently the separation of gases by diffusion has become of great importance, particularly for the separation of the isotopic species of an element. One such process involves the separation of isotopic species of uranium hexafluoride, a highly corrosive and extremely poisonous gas. Disposal of stack gases from such a process is a serious problem, and improper or incomplete disposal of such waste gases may be a considerable health hazard.

In a type of diffusion-separation system used in the separation of the isotopic species of uranium hexafluoride, a relatively large number of individual diffuser-separator units are arranged in a so-called cascade. The cascade is made up of a series of stages with the diffuser units in each stage being arranged in parallel. The gas which diffuses through the diffuser-separator units is enriched somewhat with respect to the lighter component of a gaseous mixture and passes on to a succeeding stage of the cascade. Undiffused gas is in part recycled and in part returned to an earlier stage of the cascade. Such a diffusion system normally operates under reduced pressure, and any leak of undesirable fluids into a portion of the cascade results in a loss in efficiency of the process. Elaborate precations are taken to minimize inleakage, and when a leak of this nature occurs it is often necessary to purge the equipment with some neutral gas such as nitrogen to remove the corrosive uranium hexafluoride in order that the leak may be repaired.

Because of the highly corrosive and poisonous nature of the uranium hexafluoride gas it is desirable that little or none be purged to the atmosphere surrounding the diffusion plant. One method of retaining the uranium hexafluoride gas carried in the purging gas stream is the use of so-called cold traps. These act to condense the hexafluoride gas to solid uranium hexafluoride. To ensure complete removal of the uranium hexafluoride from the purge system, the stream is flowed through a bed of activated carbon or other adsorbent to remove the last traces of the hexafluoride from the nitrogen stream before it is discharged to the atmosphere.

Aside from the health hazard, a further problem is introduced by the loss of the valuable uranium hexafluoride gas particularly in the later stages of the operation where the gas being handled is relatively pure and thus more valuable. It is desirable that a purge system such as described above be extremely efficient to retain as much of the hexafluoride gas as possible, since losses in this regard will result in corresponding losses in the efficiency of the process.

In accord with these reasons the outlet gas of the purge system generally should not contain more than 0.1 milligrams of uranium hexafluoride per liter of gas. It is therefore necessary that a method be available for detecting and determining in a semi-quantitative manner the concentration of uranium hexafluoride in the waste gas stream, and for indicating that concentration.

It is an object of the present invention to provide a simple and convenient method for detecting and estimating the quantity of a compound in a stream of gas.

It is another object of the invention to provide a simple, convenient method for estimating and indicating the concentration of a uranium-containing compound in a stream of gas.

It is still another object of the invention to provide a method for indicating the degree of uranium hexafluoride contamination in a gas stream.

Other objects of the invention will be in part obvious and in part pointed out hereinafter.

Essentially the objects of the present invention are carried out by flowing the gas stream containing a uranium compound at a controlled rate through a predetermined length of a bed containing a reagent color-reactive with uranium compounds and measuring the rate at which the color produced by the reaction of the uranium compound and the color-reactive reagent advances through the bed of the reagent. One such reagent that has been found useful for this purpose is crystalline salicylic acid which produces a gold-green color when it reacts with uranium compounds.

It has been found that the rate at which the color advances along the bed of color-reactive reagent is dependent upon the concentration of the uranium salt at any particular conditions of flow rate and pressure, although this rate does not vary linearly with the concentration. The rate of flow of gas also affects the rate of color progression, causing it to become more rapid as the flow rate increases and vice versa. The dimensions of the bed of color-reactive reagent should be such that the flow of gas through the bed and the pressure drop across the bed are reproduced in each determination made in a priorly calibrated apparatus. In general, the same weight of color-reactive reagent is packed into a bed of the same dimensions to reproduce results.

An example of the method of the present invention is presented to illustrate the application of the method to the detection and estimation of uranium hexafluoride, and it is to be understood that the invention is not to be limited to the specific details disclosed.

Reference will be made herein to the use of salicylic acid as the color-reactive reagent employed, although other compounds which produce color with uranium salts may be usefully employed. A quantity of crystalline salicylic acid weighing 1.50 grams was weighed into a glass tube having a diameter of approximately 0.343 inch. The salicylic acid was packed to a depth of 4.8 centimeters by means of a glass plunger. The flow of the gas containing uranium hexafluoride was regulated by means of a constriction in the flow line so that a flow of approximately 6 cubic centimeters per minute took place at about 1 atmosphere pressure upstream. At this flow rate the pressure drop across the bed of salicylic acid reagent was approximately 0.7 millimeter of mercury.

Under these conditions in the gas stream with approximately 0.1 milligram of uranium hexafluoride per liter, the green color produced by reaction between salicyclic acid and uranium hexafluoride advanced approximately 0.5 millimeter per day. At this concentration approximately 20 milligrams of uranium hexafluoride were adsorbed in 1 centimeter of the colored zone of the reagent. When the concentration of the uranium hexafluoride in the gas stream was about 5 milligrams of uranium hexafluoride per liter of gas, the color advanced along the bed of salicylic acid about 33 centimeters per day. At this concentration approximately 5.4 milligrams of uranium hexafluoride were adsorbed in 4 centimeters of the colored zone of the reagent, producing a less intense but nevertheless entirely visible coloration.

The color produced in the reagent bed gives some indication of the concentration of the uranium salt in the gas stream. Further, the rate at which the color progresses at predetermined flow and pressure conditions provides a very convenient method for indicating the point at which the concentration exceeds a desired value. Impurities which generally accompany uranium hexafluoride, such as hydrogen fluoride and fluorine, do not interfere with the reaction between the uranium compound and salicylic acid. However, the presence of moisture may cause hydrolysis of the uranium hexafluoride to form uranyl fluoride which does not produce any color under these conditions.

The method is capable of many variations, such as the use of color-reactive compounds other than salicylic acid as already noted above. The particular conditions to be employed when applying the present method to any specific process will depend on the conditions of the process itself since the present method is extremely flexible, calibration being required under the particular conditions employed. When using salicylic acid, the temperature of the gas stream should be maintained at a sufficiently low value to avoid appreciable vaporization of the color-reactive compound.

Other methods of preparing the bed of color-reactive reagent have been used. One of these comprises impregnating a porous porcelain plug of the desired diameter with an alcoholic solution of salicylic acid and then drying. The use of a ceramic plug in this manner is relatively convenient since it may be fused into the tube employed in the test and impregnated with the color reagent in place. Also the use of a ceramic plug provides a convenient way for obtaining reproducible dimensions of the bed of the reagent used. Other porous media may also be used for this purpose.

The present invention as described hereinbefore may be employed in the determination of small concentrations of other compounds in a fluid stream by using a bed of a reagent which is color-reactive with the compound whose concentration is to be determined.

Still other alternatives will be apparent to those skilled in the art.

Since many embodiments might be made of the present invention and since many changes might be made in the embodiment described, it is to be understood that the foregoing description is to be interpreted as illustrative only and not in a limiting sense.

We claim:

1. A method of determining the concentration of uranium hexafluoride in a gas stream that comprises flowing said gas stream at a predetermined rate through a bed containing a uniformly distributed, predetermined weight of salicylic acid whereby a color is produced by reaction between the salicylic acid and the uranium hexafluoride and continuing the flow of said gas stream through said bed to cause said color to advance in the direction of flow of said gas stream, the rate of color advance being an indication of the concentration of said uranium hexafluoride in the gas stream.

2. A method of determining the concentration of uranium hexafluoride in a gas stream that comprises flowing said gas stream at a rate of 6 cubic centimeters per minute through a bed containing a uniformly distributed, predetermined weight of salicylic acid whereby a color is produced by reaction between the salicylic acid and the uranium hexafluoride and continuing the flow of said gas stream through said bed to cause said color to advance in the direction of flow of said gas stream, the rate of color advance being an indication of the concentration of said uranium hexafluoride in the gas stream.

3. A method of determining the concentration of uranium hexafluoride in a gas stream that comprises flowing said gas stream at a predetermined rate through a porous plug impregnated with a uniformly distributed, predetermined weight of salicylic acid whereby a color is produced by reaction between the salicylic acid and the uranium hexafluoride and continuing the flow of said gas stream through said bed to cause said color to advance in the direction of flow of said gas stream, the rate of color advance being an indication of the concentration of said uranium hexafluoride in the gas stream.

References Cited in the file of this patent

UNITED STATES PATENTS

| | | |
|---|---|---|
| 2,174,349 | Littlefield | Sept. 26, 1939 |
| 2,429,694 | King | Oct. 28, 1947 |